(12) United States Patent
Rümpler et al.

(10) Patent No.: US 7,709,036 B2
(45) Date of Patent: May 4, 2010

(54) METHOD FOR GRANULATING MALT EXTRACTS

(75) Inventors: Karlheinz Rümpler, Weimar (DE); Mike Waskow, Weimar (DE); Bernhard Wand, Apolda (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 997 days.

(21) Appl. No.: 11/151,629

(22) Filed: Jun. 13, 2005

(65) Prior Publication Data
US 2005/0282724 A1    Dec. 22, 2005

(30) Foreign Application Priority Data
Jun. 15, 2004    (DE)    ........................ 10 2004 028 883

(51) Int. Cl.
*A23L 3/46*    (2006.01)
(52) U.S. Cl. ........................ 426/467; 426/443; 426/469; 426/471; 426/472; 426/474
(58) Field of Classification Search .................. None
See application file for complete search history.

(56) References Cited
U.S. PATENT DOCUMENTS
4,858,552 A    8/1989    Glatt et al.
4,946,654 A    8/1990    Uhlemann et al.
6,740,632 B1    5/2004    Jacob et al.
2003/0196598 A1    10/2003    Jones et al.
2003/0200919 A1    10/2003    Jones et al.
2003/0200920 A1    10/2003    Jones et al.
2005/0003041 A1    1/2005    Kamil

FOREIGN PATENT DOCUMENTS
DE    101 38 927    2/2003
DE    101 46 778    4/2003

*Primary Examiner*—Lien Tran
(74) *Attorney, Agent, or Firm*—Volpe and Koenig, P.C.

(57) ABSTRACT

A method for producing granules made from malt extract is provided. The method provides for producing granules continuously or in batches under the prevention as much as possible of non-uniform temperature distributions in the production process. Simultaneously, the controllability of the granulation in the production is improved. This is realized by linking thermal conditions in the spraying zone and the temperature conditions in other region of the apparatus. This is achieved such that the supply of the heated process gas for drying is realized exclusively in the spraying region. The reliable supply of particles into the spraying region is performed through the special geometric configuration of the apparatus under the use of gravity.

20 Claims, 1 Drawing Sheet

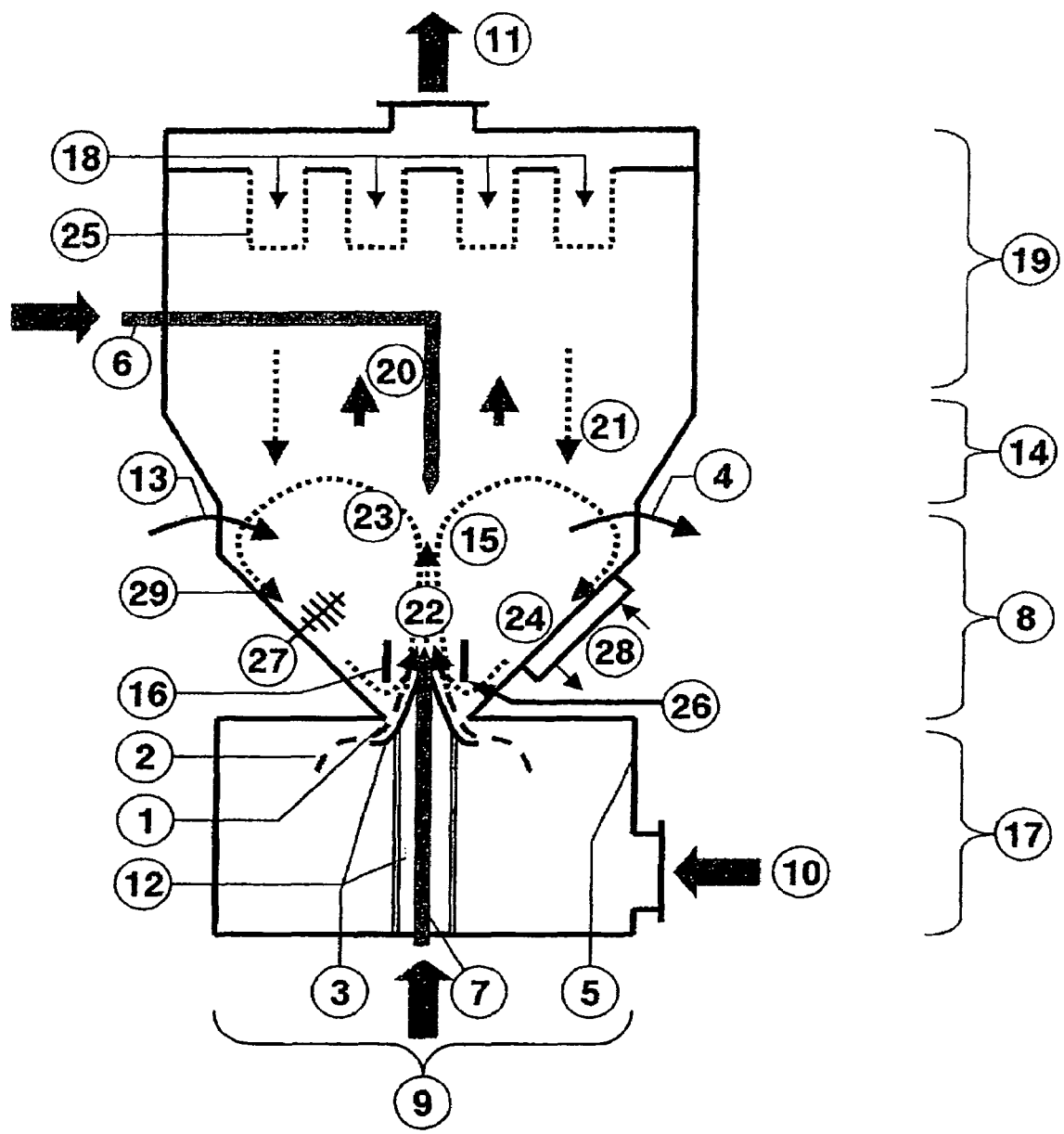

METHOD FOR GRANULATING MALT EXTRACTS

BACKGROUND

The invention relates to a method for producing granules from malt extract. Typical substances in the sense of the present invention are various malt extracts from grains, such as barley, wheat, rice, corn, etc., which are provided for use in the food and beverage industries, as well as for beer production.

Up until now, malt extracts have been used, as a rule, as aqueous suspensions with a solids content of up to 80%. If further processing is not performed at the same site, then large amounts of water must be transported.

However, after being concentrated in vacuum evaporation, malt extracts can be granulated in fluidized beds (EP 02712929.5). Here, the handling of the concentrate is difficult. Conglutination and unstable processing conditions occur. The effectiveness of such processes is low.

SUMMARY

The objective of the invention is to create a method for producing granules, in which the particles can be produced continuously or in batches with the prevention as much as possible of non-uniform temperature distributions in the production process and with an increase in the yield. Simultaneously, the controllability of the granulation in the production shall be improved.

This objective is solved according to the features of the invention.

According to the invention, the production of particles is realized through spray granulation by linking the thermal conditions in the spray zone and the temperature conditions in the other region of the apparatus. In the process according to the invention, this is achieved in that the supply of heated process gas for drying is realized exclusively in the spraying region. The reliable feed of particles into the spraying region is realized through the special geometric configuration of the apparatus taking advantage of the force of gravity.

The advantage of the solution according to the invention is that the production conditions are adapted to the material properties to be produced. Non-uniform temperature distributions are prevented to a large extent, by means of which an increase in the yield is also achieved.

Additional advantageous configurations are described below and in the subordinate claims. They are explained in the description together with their effect.

BRIEF DESCRIPTION OF THE DRAWINGS

The invention is described in more detail below with reference to a preferred embodiment. In the single drawing FIGURE, a system for performing the method according to the invention is shown schematically.

DETAILED DESCRIPTION OF THE PREFERRED EMBODIMENT

The amount of heated process gas 10 (usually heated air or also nitrogen) needed for drying the granules to be produced is fed to a supply air chamber 17 having preferably a rectangular cross section 9 and bordering side walls 5. The process gas 10 disperses itself within the supply air chamber 17 and enters into the process chamber 8 in the form of gas jets 2 via gap openings 1. The process gas stream entering preferably horizontally through the gap 1 is deflected, preferably upwards, into the process chamber 8 by the deflection part 3 and flows into the apparatus as a kind of free jet. In addition, the apparatus cross section can optionally enlarge into the expansion zone 14, so that the speed of the process gas flow continuously declines as it moves upwards. The gas leaves the apparatus as exhaust gas 11 above the expansion zone 14 via the exhaust part 19, in which optionally a dust removal system (e.g., filter cartridges or textile filter elements) can be integrated.

In the process chamber 8, there is a number of particles, which are entrained upwards by the process gas stream. In the upper region of the process chamber 8, as well as in the expansion zone 14 located above this region, the gas speed declines, so that the particles flowing upwards emerge from the gas stream 23 at the side and fall back into the process chamber 8. The process chamber 8 is bounded in the lower region by inclined side walls 29. Limited by this side inclination, the particles are fed in the direction of the gas inlet gap 1 under the effect of gravity via the return zone 24, where they are then entrained again by the process gas in the process chamber 8.

Through this mechanism, a very uniform solids circulation 15 is formed, consisting of an upwards flow and a return in the direction of the process gas inlet. Therefore, there is a high particle density even for very low amounts of particles in the process chamber 8 in the core zone above the deflection part 3. In this region, one or more spray nozzles 7 are arranged, which spray upwards in the same direction towards the process gas stream and which are used for introducing the liquid formulation.

Through the high particle load in the core zone, very advantageous conditions for the heat and material transfer are produced in the spraying zone 22. It is further achieved that the liquid precipitates to the greatest extent possible onto the particles and thus these particles are uniformly wetted over their surfaces. The uniform wetting with simultaneously a high solids circulation between the spraying region and the return zone 24 has the effect that a very uniform liquid film is formed. Due to the drying process, the liquid evaporates and leaves the apparatus with the exhaust gas 11. The solids contained in the formulation remain on the particle surfaces. Therefore, the granules grow very uniformly and homogeneously, which also leads to a very narrow grain size distribution of the product without the use of special classifying devices (e.g., zigzag sifter).

The process gas can discharge a portion of the particles, as well as fine material and dust as solids-bearing exhaust air 20 from the process chamber 8. For trapping these particles, the filter system optionally integrated in the exhaust part 19 or dust removal systems connected after the apparatus can be used. In the case of an integrated dust removal system 25, for example, compressed air pulses 18 can be used in order to return trapped particles as separated solids 21 into the process chamber 8.

In comparison with fluidized-bed apparatuses with integrated filter systems, the dust return is simplified, such that the upwards directed process gas flow is significantly localized and thus the returning particles can reliably fall outside of the gas stream. Due to the suction effect in the vicinity of the gas inlet gap 1, this mechanism is additionally supported. Alternatively, particles separated from the exhaust air can be returned into the process chamber 8. For this purpose, many different types of supply ports 26 can be arranged in the lower region of the inclined side walls 29. Limited by the high speed of the process gas stream in the vicinity of the gas inlet gap 1, the fine particles are suctioned and supplied to the spraying zone 22, where these particles are wetted with liquid and participate in the growing process.

Optionally installed guide plates 16 support the gas flow, amplify the suction effect, and improve the supply of the solids into the spraying zone 22. Possible agglomeration effects are minimized, because in the spraying region, very high flow speeds and thus higher separating forces than in fluidized beds occur. Therefore, particles are separated and grow into very spherical granules.

The flow profile of the process gas in the process chamber 8 has the further effect that fine particles returned into the process chamber from the optionally integrated filter system do not fall back into the spraying zone 22. Therefore, the conglutination of fine particles and resulting agglomerate formation processes are prevented.

For continuous process control, the apparatus can be equipped with various optional feeding systems 13 for solids. Therefore, for example, particles can be fed to the process, which can be obtained, for example, through comminution of oversized granules and/or from too small granules. These particles are then used as granule seeds or as starter filling for shortening the start-up time. In addition, here, additives, carrier materials, or other process materials in solid form can be fed into the process, which are to be embedded into the granules.

Furthermore, the apparatus can be provided with discharge elements 4 in order to be able to remove particles from the process chamber 8. This can be realized, for example, through overflow or through a volumetric discharge element (e.g., a cellular wheel sluice) or also through a gravity sifter (e.g., a zigzag sifter charged with sifting gas or a rising pipe sifter).

Optionally, a mechanical aggregation unit 27 can be housed in the process chamber 8, but preferably in the region of the return zone 24 on the inclined walls, in order to generate sufficient fine material through comminution as seed for the granule formation process. Furthermore, the return zone 24 can be used optionally for positioning heating devices or other heat-transfer devices 28. For example, the apparatus wall can have a double-wall configuration in order to use these walls, for example, under the use of liquid or gaseous heat carriers, for heating or cooling. Alternatively, microwave heaters could also be used in order to perform a post-drying process or a pre-warming process on the particles in the return zone 24.

In the process chamber 8 or in the apparatus parts, the expansion zone 14 and the exhaust part 19, lying above the chamber, optional spraying nozzles 6 can be arranged, which preferably spray downwards, but also partially upwards. Here, the liquid formulation can likewise be injected in order to generate granule seeds, for example, through spray drying in the apparatus. Alternatively, additives or other components in liquid form can be injected via a few of the spraying devices 6 and 7 and thus can be embedded into the granule structure homogeneously. If the spraying nozzles 7 pass the hot-gas charged supply air chamber 17, optionally the liquid-guiding parts can be provided with insulation or various cooling systems 12 in order to prevent damage to the liquid formulation.

As another advantage of the process according to the invention, the very simple structure should be mentioned, which provides high operational reliability and insensitivity to faults with very good cleanability. Thus, improved production conditions are created, especially concerning the hygienic requirements when changing products for biological materials.

EXAMPLES

The invention is illustrated with reference to application examples, without being limited thereby in any way.

Example 1

Granulation of Malt Extract from Barley

A liquid formulation, which was produced 100% from barley, was used.

The formulation had a total dry material percentage of approximately 60 mass percent and was injected into an apparatus, which is characterized by the structure described below. The process chamber is formed with a rectangular cross section and has, above the inclined side walls, a cross-sectional surface area of $0.2 \times 1.0 = 0.2$ m$^2$ and a height of approximately 1 m. The supply of the process air stream heated to approximately 105° C. was performed via two gas supply gaps extending longitudinally through the apparatus. The liquid formulation was injected via three compressed air-charged two-component nozzles spraying vertically upwards into the process air stream with a mass flow of approximately 18 kg/h. The process was started with a starter filling made from type-specific material. However, alternatively this starter filling can be formed at the beginning of the process by spray drying. In the process chamber, there was approximately 15 kg of particles in stationary state for continuous production. Through the evaporation process, the process air cooled down and left the apparatus at approximately 70° C. The dust removal from the exhaust air was performed by a filter system integrated in the upper part of the apparatus, and the separated solids were fed into the process chamber near the gap as seed material. The removal of granules from the process chamber was performed at the end face through the use of a gate and a downstream cellular wheel sluice. The removed granules had a non-solidified bulk density of 760 g/l and the following grain size distribution (sieve analysis):

| | |
|---|---|
| >1000 µm: | 0.0 mass % |
| 630 ... 1000 µm: | 55.6 mass % |
| 400 ... 630 µm: | 37.7 mass % |
| 315 ... 400 µm: | 3.2 mass % |
| 100 ... 315 µm: | 1.5 mass % |
| 0 ... 100 µm: | 0 mass % |

The average material residence time in continuous operation of the system was equal to approximately 80 minutes in this example.

Example 2

Granulation of Malt Extract from Barley and Corn

A liquid formulation, which was produced 70% from barley and 30% from corn, was used.

The formulation had a total dry material percentage of approximately 70 mass percent and was injected into an apparatus, which is characterized by the structure described below. The process chamber is formed with a rectangular cross section and has, above the inclined side walls, a cross-sectional surface area of $0.2 \times 1.0 = 0.2$ m$^2$ and a height of approximately 1 m. The supply of the process air stream heated to approximately 105° C. was performed via two gas supply gaps extending longitudinally through the apparatus. The liquid formulation was injected via three compressed air-charged two-component nozzles spraying vertically upwards into the process air stream with a mass flow of approximately 20 kg/h. The process was started with a starter filling made from type-specific material. However, alternatively this starter filling can be formed at the beginning of the process through spray drying. In the process chamber, there was approximately 15 kg of particles in stationary state for continuous production. Through the evaporation process, the process air cooled down and left the apparatus at approximately 70° C. The dust removal from the exhaust air was performed through a filter system integrated in the upper part of the apparatus and the separated solids were fed into the process chamber near the gap as seed material. The removal of granules from the process chamber was performed at the end face via a gate and a downstream cellular wheel sluice. The removed granules had a non-solidified bulk density of 690 g/l and the following grain size distribution (sieve analysis):

| | |
|---|---|
| >1000 μm: | 0.0 mass % |
| 630 . . . 1000 μm: | 4.8 mass % |
| 400 . . . 630 μm: | 35.5 mass % |
| 315 . . . 400 μm: | 24.1 mass % |
| 100 . . . 315 μm: | 35.6 mass % |
| 0 . . . 100 μm: | 0 mass % |

The average material residence time in the continuous operation of the system was equal to approximately 60 minutes in this example.

Example 3

Granulation of Wort Necessary for Beer Production

A liquid formulation, like that typically generated for beer production, was used.

The formulation had a total dry material percentage of approximately 35 mass percent and was injected into an apparatus, which is characterized by the structure described below. The process chamber is formed with a rectangular cross section and has, above the inclined side walls, a cross-sectional surface area of $0.2\times1.0=0.2\ m^2$ and a height of approximately 1 m. The supply of the process air stream heated to approximately 120° C. was performed via two gas supply gaps extending longitudinally through the apparatus. The liquid formulation was injected via three compressed air-charged two-component nozzles spraying vertically upwards into the process air stream with a mass flow of approximately 12 kg/h. The process was started with a starter filling made from type-specific material. However, alternatively this starter filling can be formed at the beginning of the process through spray drying. In the process chamber, there was approximately 15 kg of particles in stationary state for continuous production. Through the evaporation process, the process air cooled down and left the apparatus at approximately 70° C. The dust removal from the exhaust air was performed by a filter system integrated in the upper part of the apparatus, and the separated solids were fed into the process chamber near the gap as seed material. The removal of granules from the process chamber was performed at the end face via a gate and a downstream cellular wheel sluice. The removed granules had a non-solidified bulk density of 810 g/l and the following grain size distribution (sieve analysis):

| | |
|---|---|
| >1000 μm: | 0.3 mass % |
| 630 . . . 1000 μm: | 46.5 mass % |
| 400 . . . 630 μm: | 31.5 mass % |
| 315 . . . 400 μm: | 9.9 mass % |
| 100 . . . 315 μm: | 11.8 mass % |
| 0 . . . 100 μm: | 0 mass % |

The average material residence time in the continuous operation of the system was equal to approximately 3 hours in this example.

The invention can be summarized as follows:

The invention relates to a method for producing granules from malt extract.

The objective of the invention is to create a method for producing granules, in which the granules can be produced continuously or in batches under the prevention as much as possible of non-uniform temperature distributions in the production process. Simultaneously, the controllability of the granulation in the production should be improved.

According to the invention, the production of granules is realized by linking the thermal conditions in the spraying zone and the temperature conditions in the other region of the apparatus. In the process according to the invention, this is achieved such that the supply of the heated process gas for drying is realized exclusively in the spraying region. The reliable supply of particles into the spraying region is realized through the special geometrical configuration of the apparatus under the use of gravity.

The invention claimed is:

1. A method for producing granules with a narrow grain size distribution, with a round grain shape from malt extracts, the method comprising a process including:

providing a granulating apparatus;

feeding heated process gas into a supply air chamber (17) of the apparatus as streams in the form of gas jets via a gas inlet gap (1) deflecting the jets upwards by deflection parts (3) into a process chamber (8), so that the resulting heated process gas streams flow in as a free jet, allowing the heated process gas to leave as exhaust gas via an exhaust part (19) above a gas expansion zone (14) located above the process chamber (8);

entraining particles upwards by the heated process gas streams, said particles being (i) particles formed at the beginning of the process by spray drying in the granulation apparatus of a liquid formulation of the malt extract, in order to generate granule seeds as particles, which liquid formulation is injected via spraying nozzles (6) arranged in the process chamber (8) or in the expansion zone (14), the exhaust part (19) or other apparatus parts lying above the process chamber (8), and/or (ii) particles fed in after being obtained through comminution of oversized granules or from undersized granules, said oversized or undersized granules already obtained from malt extract; and the particles participating in a growing process leading to the granules to be produced which are also entrained by the heated process gas streams, where in an upper region of the process chamber (8) and the gas expansion zone (14), located above the upper region, speed of the heated process gas streams declines, so that the particles flowing upwards emerge from the heated process gas streams in an arcing manner and fall back into the process chamber (8), said process chamber (8) being bounded in a lower region by inclined side walls feeding the particles in the direction of the gas inlet gaps (1) by gravity where they are then entrained again by the heated process gas streams in the process chamber (8), thus forming a very uniform particle circulation including an upwards flow and a return in a direction of the process gas inlet gaps (1), where in a zone above the deflection parts (3) at least one spray nozzle (7) is arranged which sprays upwards into the heated process gas streams, which introduces a liquid formulation of the malt extract, and forms a uniform film of the liquid formulation on the particles, the heated process gas streams evaporating the liquid which also leaves the apparatus with the exhaust gas, while solids contained in the liquid formulation remain on surfaces of the particles, where additives in liquid form are injected via a few of the spraying nozzles (6) and (7) and thus are embedded into the granule structure of the growing particles homogeneously; said particles thus forming the granules.

2. Method according to claim 1, further comprising removing the granules from the process chamber via a sifting device.

3. Method according to claim 1, further comprising removing the granules from the process chamber via a volumetric discharge element.

4. Method according to claim 1, wherein the granules that have been removed from the process and that are too large or too small are separated from acceptable product.

5. Method according to claim 4, further comprising returning separated particles that have been removed from the process and that are too small into the process chamber as seed material for granule formation.

6. Method according to claim 4, further comprising comminuting granules that have been removed from the process and that are too large using mechanical aggregation and returning comminuted granules into the process chamber as seed material for granule formation.

7. Method according to claim 5, further comprising subjecting the granules returned into the process chamber to a secondary heat treatment.

8. Method according to claim 7, further comprising drying or pre-warming the granules returned into the process chamber.

9. Method according to claim 1, further comprising producing the granules by adding additives or other components in liquid form via a few of the spraying nozzles (7) and optional nozzles (6) lying above the process chamber in the apparatus.

10. Method according to claim 1, further comprising feeding additional process materials in solid form into the process.

11. Method according to claim 1, wherein the granules are coated in the same apparatus.

12. Method according to claim 1, wherein an average residence time of the granules in the process chamber can be adjusted and can be in a range from one or more minutes to a number of hours.

13. Method according to claim 6, further comprising subjecting the granules returned into the process chamber to a secondary treatment.

14. Method according to claim 13 further comprising drying or pre-warming the granules returned into the process chamber.

15. Method according to claim 1, where the method for producing granules is performed continuously.

16. Method according to claim 1, where the method for producing granules is performed in batches.

17. The process according to claim 1, where the liquid formulation is a malt extract 100% from barley and has a total dry material percentage of about 60 mass percent.

18. The process according to claim 1, where the liquid formulation is a malt extract 70% from barley and 30% from corn and has a total dry material percentage of about 70 mass percent.

19. The process according to claim 1, where the liquid formulation is a malt extract from wort generated for beer production and has a total dry material percentage of about 35 mass percent.

20. The process according to claim 1, wherein the particles further comprise additive or carrier material in solid form.

* * * * *